United States Patent [19]

Hashimoto

[11] Patent Number: 4,653,647
[45] Date of Patent: Mar. 31, 1987

[54] SORTING AND STACKING APPARATUS

[75] Inventor: Susumu Hashimoto, Yokohama, Japan

[73] Assignee: Tokyo Shibaura Denki Kabushiki Kaisha, Kawasaki, Japan

[21] Appl. No.: 882,433

[22] Filed: Jul. 7, 1986

Related U.S. Application Data

[63] Continuation of Ser. No. 532,516, Sep. 15, 1983, abandoned.

[30] Foreign Application Priority Data

Sep. 16, 1982 [JP] Japan ................................ 57-161364

[51] Int. Cl.[4] ............................................ B07C 5/342
[52] U.S. Cl. ................................... 209/534; 209/551; 271/288; 377/8
[58] Field of Search ............... 209/534, 540, 545, 546, 209/549, 551, 933; 235/379, 475–477; 271/288–290; 377/7, 8; 194/206, 207, 216–218

[56] References Cited

U.S. PATENT DOCUMENTS

| 2,950,799 | 8/1960 | Timms | 209/534 X |
| 3,764,995 | 10/1973 | Helf, Jr. et al. | 364/579 X |
| 3,873,443 | 3/1975 | Cothran et al. | 209/933 X |
| 3,944,078 | 3/1976 | Altenpohl | 209/551 |
| 4,236,639 | 12/1980 | Boettge et al. | 209/534 |
| 4,369,360 | 1/1983 | Tsuji | 235/379 |
| 4,437,660 | 3/1984 | Tompkins et al. | 209/534 X |

FOREIGN PATENT DOCUMENTS

| 1254395 | 11/1967 | Fed. Rep. of Germany . |
| 2729830 | 1/1979 | Fed. Rep. of Germany . |
| 3205652 | 8/1982 | Fed. Rep. of Germany . |
| 52-69695 | 9/1977 | Japan ................................ 209/534 |
| 1532019 | 11/1978 | United Kingdom . |
| 2047209 | 11/1980 | United Kingdom ................ 209/534 |
| 2091225 | 7/1982 | United Kingdom . |
| 2093809 | 9/1982 | United Kingdom ................ 209/534 |
| 2106080 | 4/1983 | United Kingdom ................ 209/534 |

Primary Examiner—Robert B. Reeves
Assistant Examiner—Edward M. Wacyra
Attorney, Agent, or Firm—Cushman, Darby & Cushman

[57] ABSTRACT

A sorting and stacking apparatus has a currency note feeding section for feeding currency notes one at a time; and a currency note inspecting section for inspecting the denomination of a currency note, a normal note, a damaged note, an obverse-presented note and a reverse-presented note. The currency notes of a predetermined denomination among the currency notes fed by the currency note feeding section are fed to a first stacking section having first and second pockets while currency notes of other denominations are fed to the second stacking section. When the first pocket of the first stacking section is filled with the currency notes, the transport path of the currency note is automatically switched toward the second pocket. Subsequent currency notes are thus stacked in the second pocket of the first stacking section.

5 Claims, 9 Drawing Figures

SORTING AND STACKING APPARATUS

This is a continuation of application Ser. No. 532,516, filed Sept. 15, 1983, which was abandoned upon the filing hereof.

BACKGROUND OF THE INVENTION

The present invention relates to an apparatus for sorting and stacking items by their types or kinds.

An apparatus for sorting and stacking various current notes or bills has been made and used. The apparatus can operate in various modes to sort and stack notes or bills by their denominations, their states, etc. It is provided with a plurality of pockets in which the sorted notes or bills will be stacked. These pockets are assigned to the respective denominations, states or other features of the currency notes or bills. When the apparatus is operated in, for instance, such mode as to sort and stack currency notes or bills by their denominations and does sort and stack currency notes or bills of a fewer denominations than the pockets provided, some of the pockets are left unused. Every time a predetermined number of currency notes or bills of the same denomination are stacked in the pocket assigned to the denomination, the apparatus is automatically stopped. It cannot operate until the currency notes or bills are taken out of the pocket. This makes it impossible to operate the apparatus with a high efficiency.

SUMMARY OF THE INVENTION

In view of the above, one object of the present invention is to provide a sorting and stacking apparatus for effectively sorting various kinds or types of items to be sorted and stacking them in a plurality of pockets.

To achieve the above object of the present invention, a sorting and stacking apparatus is provided, wherein a plurality of pockets are grouped in accordance with the different kinds of items to be sorted, and items of the same kind are alternately stacked in a corresponding group of pockets.

DETAILED DESCRIPTION OF THE PREFERRED EMBODIMENT

Figure 1:
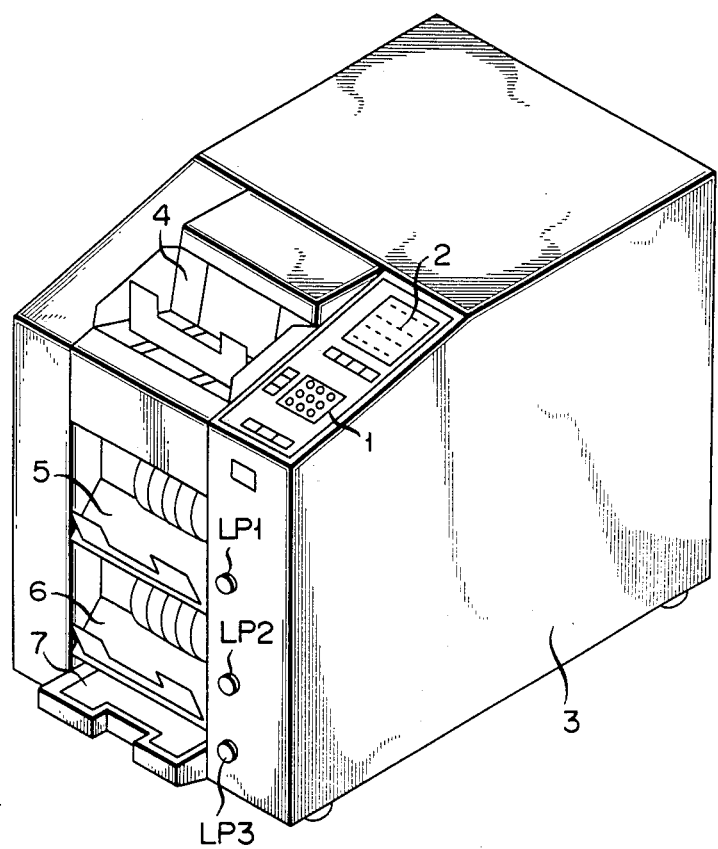
FIG. 1 is a perspective view of a sorting and stacking apparatus according to an embodiment of the present invention.

According to the sorting and stacking apparatus shown in FIG. 1, an operation section 1 for designating an operation mode, and a display section 2 for displaying a designated operation mode are provided on the front side of the upper surface of a cabinet 3. A currency note feeding section 4 is disposed next to the operation section 1 and display section 2. The currency note feeding section 4 is arranged to sequentially take in stacked currency notes (or bills) into the cabinet 3, one at a time. First, second and third pockets 5, 6 and 7 are disposed in the front wall of the cabinet 3 from the top. First, second and third display lamps LP1, LP2 and LP3 are respectively arranged next to the first to third pockets 5, 6 and 7 on the front wall. Each lamp indicates that a predetermined number of currency notes are stacked in the corresponding pocket.

Figure 2:
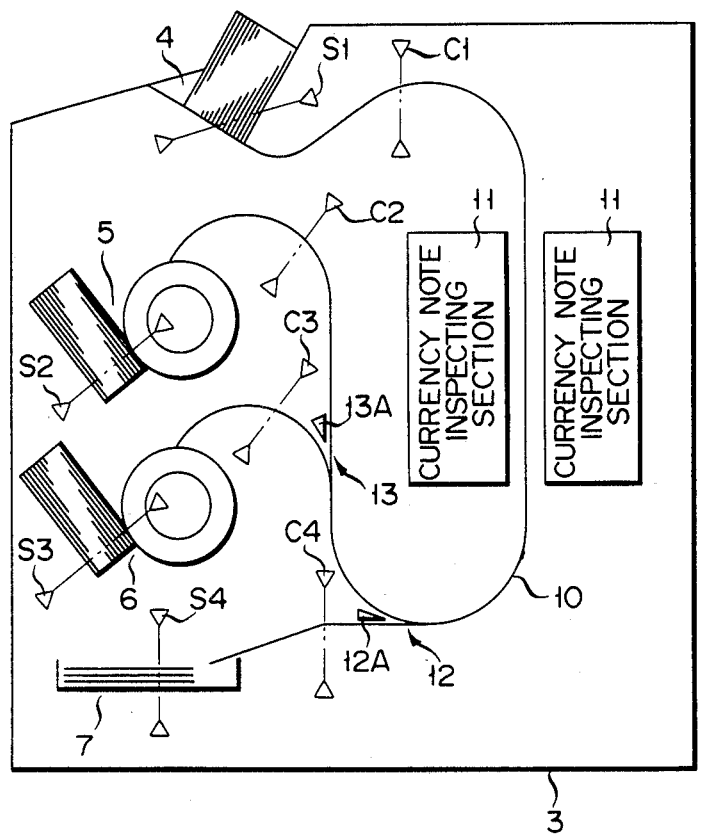
FIG. 2 is a schematic view showing the internal structure of the sorting and stacking apparatus shown in FIG. 1.

As shown in FIG. 2, a transport section 10 is so disposed as to transport the currency notes (or bills) (sequentially taken in from the currency note feeding section 4) to the first, second and third pockets 5, 6 and 7. The transport section 10 is illustrated as a currency note convey path. For example, a currency note is sandwiched between a pair of conveyer belts (not shown) and is transported. A currency note inspecting section 11 for detecting the normal/damaged state, the denomination, and the obverse/reverse surface of the currency note taken in at the currency note feeding section 4 is so arranged as to sandwich the transport or convey path of the currency note. A first gate section 12 and a second gate section 13 are disposed on the transport path, to select the transport direction of the currency note passing through the currency note inspecting section 11. The first gate section 12 switches the transport direction of the currency note toward the third pocket 7 or the second gate section 13. The second gate section 13 switches the transport direction of the currency note toward either the first pocket 5 or the second pocket 6. The first and second gate sections 12 and 13 have gates 12A and 13A which are pivoted by drive mechanisms (not shown) to change the transport directions of the currency notes, respectively. A first detector S1 is arranged at the currency note feeding section 4 to detect whether or not stacked currency notes are present therein. A first counter C1 is arranged to count the number of currency notes fed from the currency note feeding section 4. A second counter C2 is arranged in the transport path immediately before the first pocket 5 and serves to count the number of currency notes transported to the first pocket 5. A second detector S2 is arranged at the first pocket 5 to detect whether or not stacked currency notes are present in the first pocket 5. A third counter C3 is arranged in the transport path immediately before the second pocket 6 and serves to count the number of currency notes transported to the second pocket 6. A third detector S3 is arranged at the second pocket 6 to detect whether or not stacked currency notes are present in the second pocket 6. Similarly, a fourth counter C4 is arranged in the transport path immediately before the third pocket 7 and serves to count the number of currency notes transported to the third pocket 7. A fourth detector S4 is arranged at the third pocket 7 to detect whether or not stacked currency notes are present in the third pocket 7. It should be noted here that the currency note inspecting section 11 detects the denominations, states or other features of currency notes to be sorted, in accordance with an input at the operation section 1.

A stack of currency notes is stored in the currency note feeding section 4 in such a way that one short side of each of the currency notes is brought into contact with a guide (not shown). For this reason, even if several denominations of currency notes of different sizes are stacked in the currency note feeding section 4, the ends of these notes are aligned by the guide. Therefore, the currency notes sequentially fed in from the currency note feeding section 4 are transported to the currency note inspecting section 11 at a substantially constant timing. As a result, the information can be read from a substantially constant position of the note (i.e., the read error is decreased) when the denomination and the normal/damaged state of the currency notes are discriminated or designated by the currency note inspecting section 11. Thus, the number of items of reference data to be stored in a memory can be decreased, thereby effectively performing various discrimination operations.

The operation section 1 and the display section 2 may now be described in greater detail, with reference to FIG. 3. The operation section 1 comprises a count key 15, an obverse/reverse (OB/RE) key 16, a normal note (NOR) key 17, a normal/damaged note (NOR/DAM) key 18, a denomination designation key 19, a number-of-notes key 20 for presetting the number of currency notes which may be respectively stacked in the first and second pockets 5 and 6, ten keys 21 for designating the number of currency notes to be stacked and the denomination, a start key 22, a stop key 23, a clear (C) key 24, and an all-clear (AL) key 25. A numeral corresponding to depressed one or more of the ten keys 21 indicates the number of currency notes to be stacked. The numeral, however, cannot exceed the maximum number of stacked currency notes. Any one of an array of three keys of the ten keys 21 is depressed to designate a desired denomination (such as ten thousand yen, five thousand yen, one thousand yen, or five hundred yen, which are respectively marked next to the four arrays of the numeric keys 21). In this manner, the ten keys 21 are also used to designate the desired denomination, so that the operation section 1 can be made compact. If the number of currency notes to be stacked is not set by the number-of-notes key 20 and the ten keys 21, the number of currency notes is preset to half of the maximum number of currency notes (100 notes) which may be stacked in the first or second pocket 5 or 6.

Figure 3:
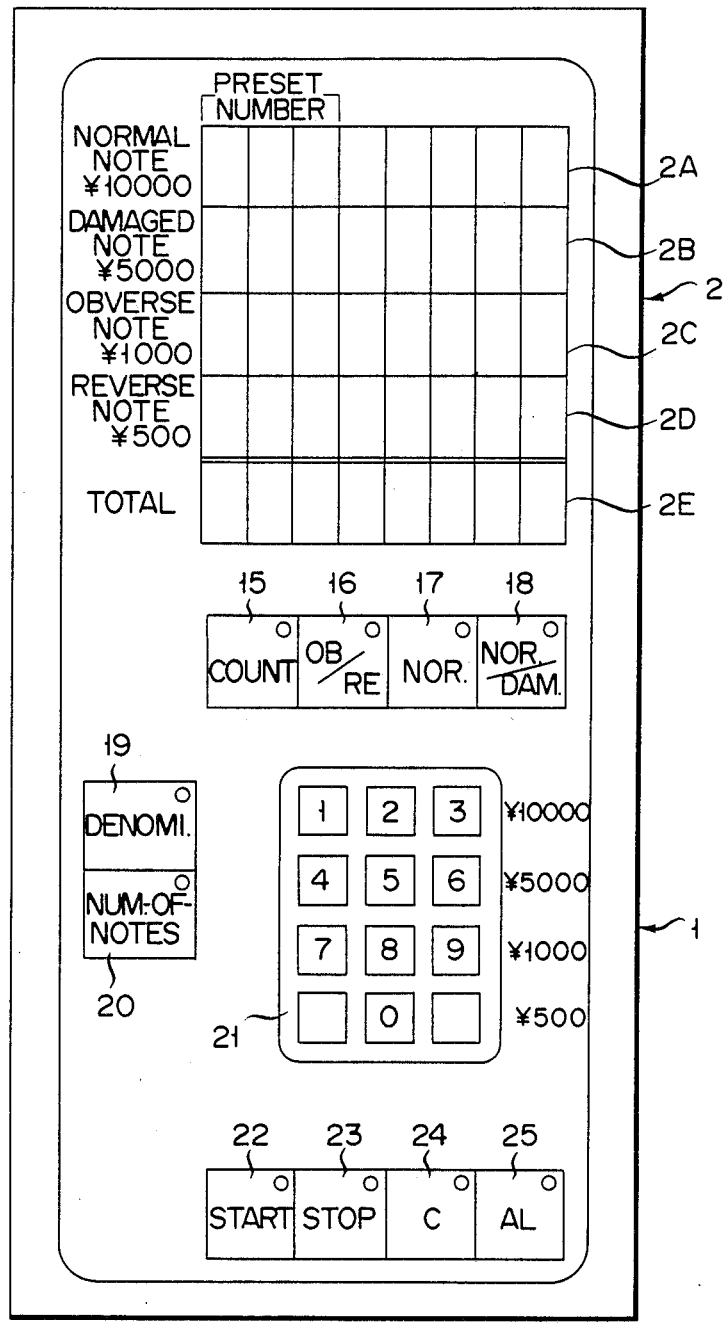
FIG. 3 is a plan view including an operation section and a display section of the sorting and stacking apparatus shown in FIG. 1.

The display section 2 has five display spaces 2A to 2E, as shown in FIG. 3. The numbers or amount of currency notes already sorted by an operation mode (to be described later) are displayed on display spaces 2A to 2D, respectively. The total of the numbers (of all denominations) of currency notes is displayed on display space 2E.

The display contents of the first to fourth display spaces 2A to 2D change in accordance with the operation modes (to be described later). The number of normal (fit) notes or the number or amount of ten-thousand yen notes is displayed in the first display space 2A. The number of damaged (unfit) notes or the number or amount of five-thousand yen notes is displayed in the second display space 2B. The number of obverse-presented notes or the number or amount of one-thousand yen notes is displayed in the third display space 2C. The number of reverse-presented notes or the number or amount of five-hundred yen notes is displayed in the fourth display space 2D. The display contents of the display spaces 2A to 2E change in accordance with the given operation mode. Therefore, the display section 2 is made compact. The number of currency notes specified by the number-of-notes key 20 and the ten keys 21 is displayed in the leftmost (upper) three digits of the first display space 2A, so that the number of currency notes displayed as a result of the operation mode is compared to the specified number. Operator mishandling caused by misrecognition of the preset number can be avoided when the number of currency notes is smaller than the preset number, due to the lack of currency notes stacked in the currency note feeding section 4, or when the apparatus is stopped during sorting.

Figure 4:
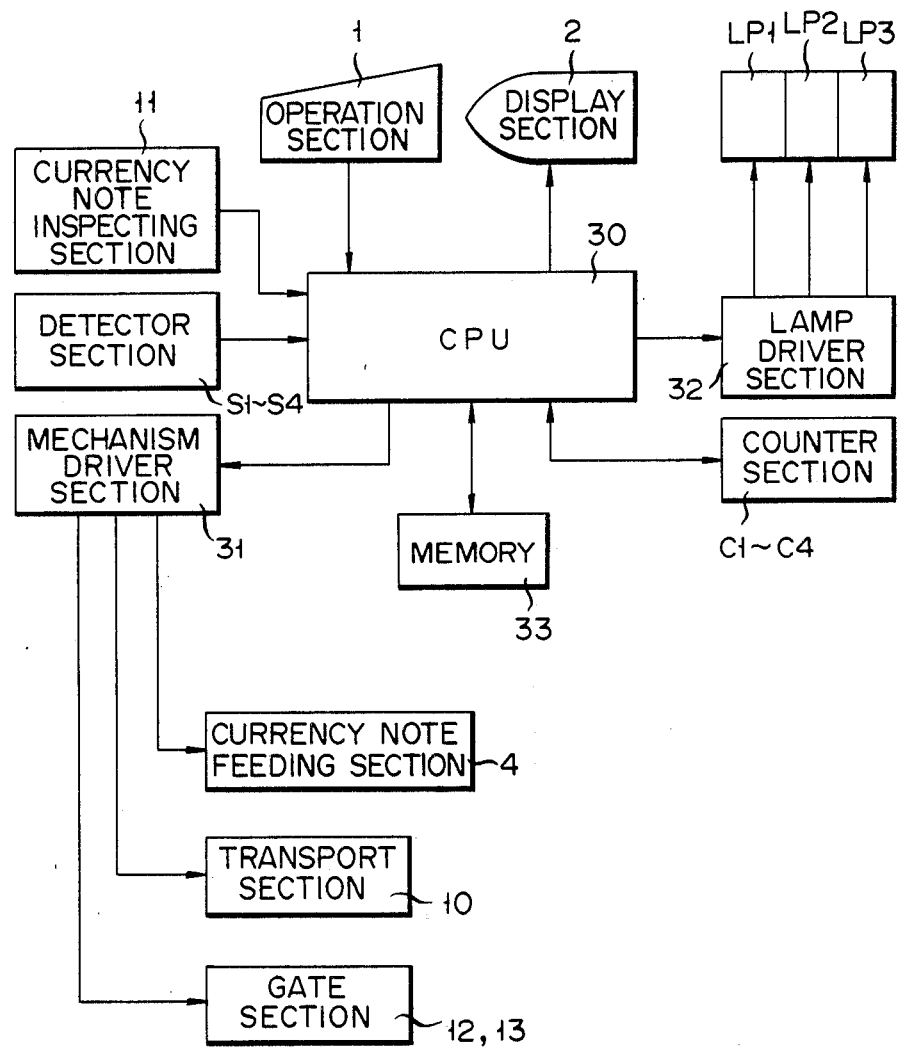
FIG. 4 is a block diagram of the sorting and stacking apparatus shown in FIG. 1.

According to the block diagram shown in FIG. 4, a CPU 30 serving as a main control section is connected to the output terminals of the operation section 1, the currency note inspecting section 11, and the detector section (first to fourth detectors S1, S2, S3 and S4). The CPU 30 is also connected to the input terminals of the display section 2, a mechanism driver section 31 and a lamp driver section 32. Furthermore, the CPU 30 is connected to a memory 33 storing various programs. The CPU 30 causes the memory 33 to read out a program corresponding to the operation mode specified at the operation section 1, and controls the related parts. The mechanism driver section 31 drives mechanism members such as the currency note feeding section 4, the gate sections 12 and 13, and the transport section 10. The lamp driver section 32 controls the ON/OFF operation of display lamps LP1, LP2 and LP3.

The operation modes of the sorting and stacking apparatus of the present invention may now be described with reference to the following table.

TABLE

| | | | Operation mode | | | | |
|---|---|---|---|---|---|---|---|
| | | | Denomination Sorting Mode | | | Normal/Damaged Sorting Mode (one denomination) | |
| | | | One denomination | | | | |
| | | | Nonsorting of | Sorting into | | | |
| Pockets | Count Mode (a) | Observe/reverse Sorting Mode (b) | Obverse- and Reverse-presented Notes (c) | Obverse- and Reverse-presented Notes (d) | Two Denominations (e) | Normal Note (obverse/reverse) (f) | Normal/Damaged Note (g) |
| First Pocket | Identifiable Note | Obverse-presented Note | Specified Denomination | Specified Denomination (obverse) | Designated Denomination A | Normal Note (obverse) | Normal Note (obverse) |
| Second Pocket | Identifiable Note | Reverse-presented Note | Specified Denomination | Specified Denomination (reverse) | Designated Denomination B | Normal Note (reverse) | Damaged Note (obverse) |
| Third Pocket | unidentifiable Note | | Unspecified Denominations | | | Specified Damaged Note | Specified Note (reverse) Unspecified Denomination |
| | | | Unidentifiable Note | | | | |

The sorting and stacking apparatus of the present invention has a count function, a normal/damaged note sorting function, a denomination sorting function, and an obverse/reverse sorting function. The operation modes of the apparatus includes a count mode (a), an obverse/reverse sorting mode (b), a one-denomination obverse/reverse nonsorting mode (c), a one-denomination obverse/reverse sorting mode (d), a two-denomination sorting mode (e), a normal note (obverse/reverse) sorting mode (f), and a normal/damaged note sorting mode (g). The count mode (a) is an operation mode wherein identifiable notes among currency notes are alternately stacked in the first and second pockets 5, 6 and unidentifiable notes are rejected and stacked in the third pocket 7. To designate this operation mode, the operator depresses the count key 15 of the operation section 1. The obverse/reverse sorting mode (b) is an operation mode wherein obverse-presented notes are stacked in the first pocket 5, reverse-presented notes are stacked in the second pocket 6, and unidentifiable notes are stacked in the third pocket 7. To designate this mode, the operator depresses the obverse/reverse key 16 of the operation section 1. The one-denomination obverse/reverse nonsorting mode (c) is an operation mode wherein notes of the specified denomination are alternately stacked in the first and second pockets 5, 6; and notes of other, nonspecified denominations and unidentifiable notes are rejected and stacked in the third pocket 7. To designate this mode, the operator depresses the denomination key 19 and one of the ten keys 21 which corresponds to a desired denomination. The one-denomination obverse/reverse sorting mode (d) is an operation mode wherein obverse-presented notes among currency notes of the specified denomination are stacked in the first pocket 5, reverse-presented notes among those are stacked in the second pocket 6; and notes of other, nonspecified denominations and unidentifiable notes are rejected and stacked in the third pocket 7. To designate this mode, the operator depresses the demonination key 19, one of the ten keys 21 which corresponds to a desired denomination and the obverse/reverse key 16. The two-denomination sorting mode (e) is an operation mode wherein notes of two specified denominations are respectively stacked in the first and second pockets 5, 6; and notes of other, nonspecified denominations and unidentifiable notes are rejected and stacked in the third pocket 7. To designate this mode, the operator depresses the denomination key 19 and two of the ten keys 21 which corresponds to two desired denominations. The normal note (obverse/reverse) sorting mode (f) is an operation mode wherein obverse-presented normal notes among currency notes of a specified denomination are stacked in the first pocket 5, reverse-presented normal notes among those are stacked in the second pocket 6; and notes of other, damaged notes of the specified designation, nonspecified notes and so on are rejected and stacked in the third pocket 7. To designate this mode, the operator depresses the normal/damaged note key 18, the denomination key 19, one of the ten keys 21 which corresponds to a desired denomination and the normal note key 17. The normal/damaged note sorting mode (g) is an operation mode wherein obverse-presented normal notes among currency notes of the specified denomination are stacked in the first pocket 5, obverse-presented damaged notes among those are stacked in the second pocket 6, and notes of other, reverse-presented notes of the specified notes, nonspecified notes and so on are rejected and stacked in the third pocket 7. To designate this operation mode, the operator depresses the normal/damaged note key 18, the denomination key 19 and one of the ten keys 21 which corresponds to a desired denomination. As may readily be seen from the above description of the operation modes, the normal note (obverse/reverse) sorting mode (f) and the normal/damaged note sorting mode (g) are employed by specifying only one denomination. The normal notes and/or damaged notes transported to the inspecting section 11 are only inspected if they belong to the specified denomination. Therefore, in the sorting modes (f), (g), inspection time is shortened, as compared to the case wherein a single denomination is not specified. As a result, the efficiency of normal/damaged note sorting can be greatly improved. In the case of denomination sorting, as may be apparent from the two-denomination sorting mode (e), two denominations can be specified at one time, and the notes of these denominations can be respectively stacked in the first and second pockets 5 and 6. The pockets 5 and 6 can be efficiently used, so that efficient sorting and stacking can be performed. Furthermore, as in the operation modes such as the count mode (a) and the one-denomination obverse/reverse nonsorting mode (c) wherein notes of the same denomination are stacked in both the first and second pockets 5 and 6, collection of subsequent notes is automatically restarted at the pocket 5 or 6 from which stacked notes have been removed. More particularly, when stacked notes are taken out of the first pocket 5 while notes are being stacked in the second pocket 6, after completion of the stacking of notes in the first pocket 5, subsequent notes are automatically stacked in the first pocket 5. As a result, notes are stacked in either the first or second pocket 5 or 6 successively, so that the apparatus need not be stopped during sorting and stacking. Therefore, the currency notes can be efficiently sorted and stacked.

The operation of the apparatus may now be described with reference to the flowcharts of FIGS. 5 to 9.

Figure 5:
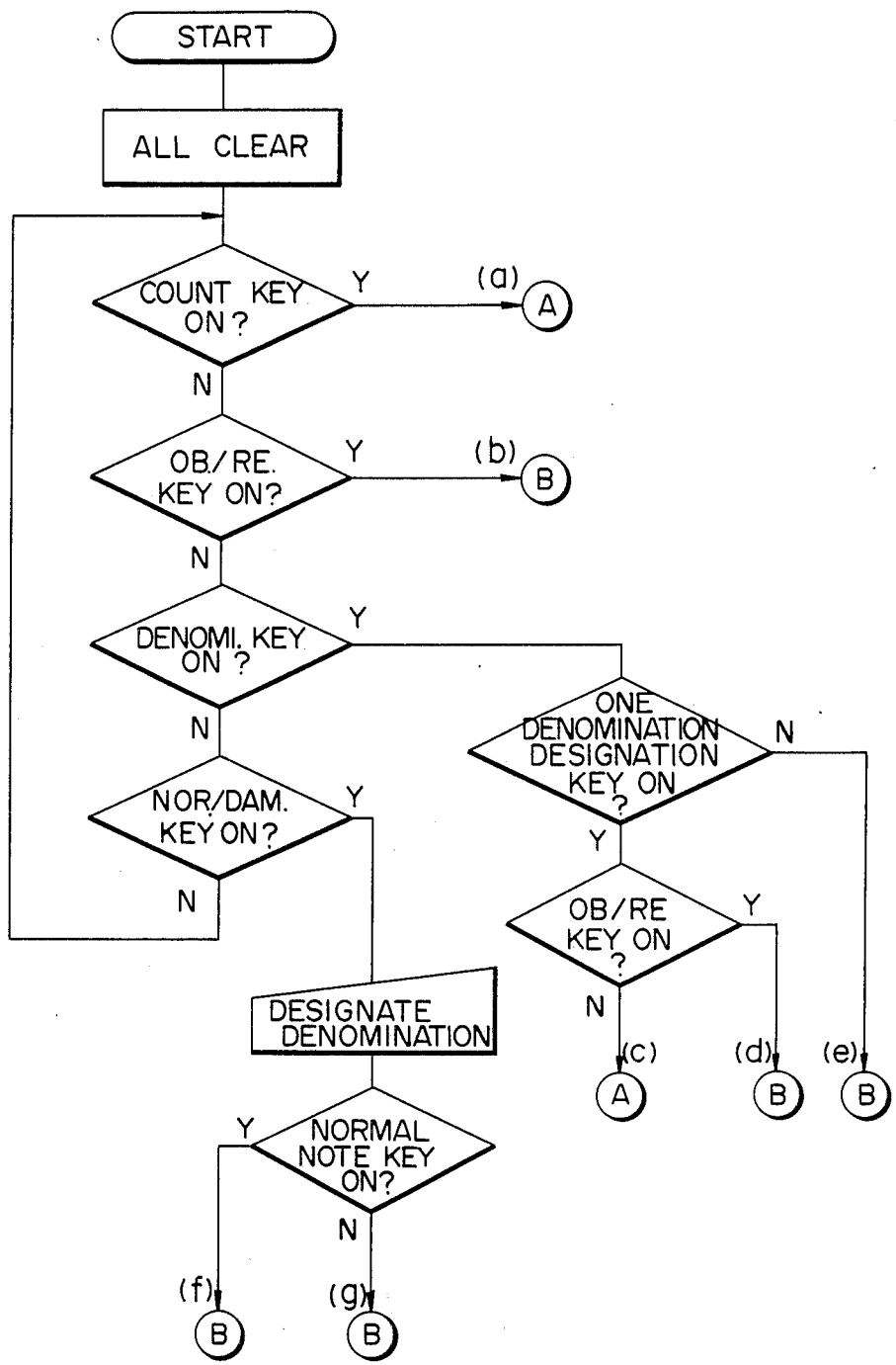
FIGS. 5 to 9 are flowcharts for explaining the operation of the sorting and stacking apparatus shown in FIG. 1.

Seven mode designation procedures will be described with reference to the flowchart of FIG. 5.

When the power is ON, an immediately previous operation mode is all-cleared. In this condition, one of the seven operation modes is designated at the operation section 1 (FIG. 3). When the operator depresses the count key 15, the count mode (a) is designated. When the operator depresses the obverse/reverse key 16, the obverse/reverse sorting mode (b) is designated. When the operator depresses the denomination key 19 and one of the ten keys 21 which corresponds to a desired denomination, the one-denomination obverse/reverse nonsorting mode (c) is designated. When the operator depresses the denomination key 19, one of the ten keys 21 which corresponds to a desired denomination and the obverse/reverse key 16, the one-denomination obverse/reverse sorting mode (d) is designated. When the operator depresses the denomination key 19 and two of the ten keys 21 which correspond to two desired denominations, the two-denomination sorting mode (e) is designated. When the operator depresses the normal/damaged note key 8 and the denomination key 19, one of the ten keys 21 which corresponds to a desired denomination and the normal note key 17, the normal note (obverse/reverse) sorting mode (f) is designated. When the operator depresses the normal/damaged note key 18 and the denomination key 19 and one of the ten keys 21 which corresponds to a desired denomination, the normal/damaged note sorting mode (g) is designated.

The modes designated by operations at the operation section 1 are discriminated by the CPU 30. The CPU 30 starts the operation in accordance with the specified operation mode. Assume that the one-denomination obverse/reverse nonsorting mode (c) is designated (the designated denomination is ten-thousand yen note). The CPU 30 executes the one-denomination obverse/reverse nonsorting mode (c) in accordance with the flowcharts in FIGS. 6 and 7. In this case, when the operator does not specify the preset number of notes by the number-of-notes key 20 and the ten keys 21, the CPU 30 automatically presets the number of notes to be 100 (to be stacked in the first and second pockets 5 and 6). However, when the number of notes is preset at the operation section 1, the CPU 30 causes the first display space 2A of the display section 2 (FIG. 3) to display the preset number in the leftmost (upper) three digits. When the preset number exceeds a maximum number (e.g., 200), the input data indicating the preset number of notes is cleared by the CPU 30. The flow returns to the number-of-notes input step. When the operator depresses the start key 22 after the number of notes is set, the first detector S1 detects whether or not any (currency) notes are stacked in the currency note feeding section 4. When the first detector S1 detects the presence of the notes, the CPU 30 drives the currency note feeding section 4 through the mechanism driver section 31. The currency note feeding section 4 feeds the notes to the transport section 10 one at a time. The transport section 10 transports each note to the currency note inspecting section 11. In this case, the first counter C1 counts the notes transported to pass thereby. The currency note inspecting section 11 discriminates the denomination of each transported note. A discrimination technique as disclosed in U.S. Pat. No. 4,352,988 or any other known technique can be used. When the denomination of the note is discriminated, the denomination data is fetched in the CPU 30. The CPU 30 determines whether or not the note is to be transported to the third pocket 7, in accordance with the discrimination data and the specified denomination data (i.e., ten-thousand yen note data). In other words, the CPU 30 determines the need of rejecting any note other than a ten-thousand yen note. Furthermore, notes which cannot be identified by the currency note inspecting section 11 are also discriminated for rejection. The CPU 30 drives the gate section 12 through the mechanism driver section 31, in accordance with the discrimination results. The first gate section 12 drives the first gate 12A to transport the notes (discriminated for rejection) to the third pocket 7. The fourth counter C4 counts the rejected notes. In this case, when the count of the fourth counter C4 is less than the maximum number (e.g., 50) of notes which may be stacked in the third pocket 7, the CPU 30 causes the flow to return to the check flow via the first detector S1. However, when the count of the fourth counter C4 is equal to (or exceeds) 50, the CPU 30 causes the mechanism driver section 31 to stop operations of the currency note feeding section 4, transport section 10, and first and second gate sections 12 and 13. The CPU 30, also, causes the lamp driver section 32 to light the third display lamp LP3. In this condition, when the operator depresses the stop key 23, the operation corresponding to a predetermined operation mode is completed and stopped. However, when the stop key 23 is not depressed, and the stacked notes are taken out of the third pocket 7, the fourth detector S4 detects the absence of notes in the third pocket 7. The CPU 30 de-energizes the lamp driver section 32 to turn off the display lamp LP3 in response to the detected signal from the fourth detector S4. At the same time, the fourth counter C4 is cleared. Thereafter, the CPU 30 causes the flow to return to the check flow via the first detector S1, and the above operation is repeated.

Figure 7:
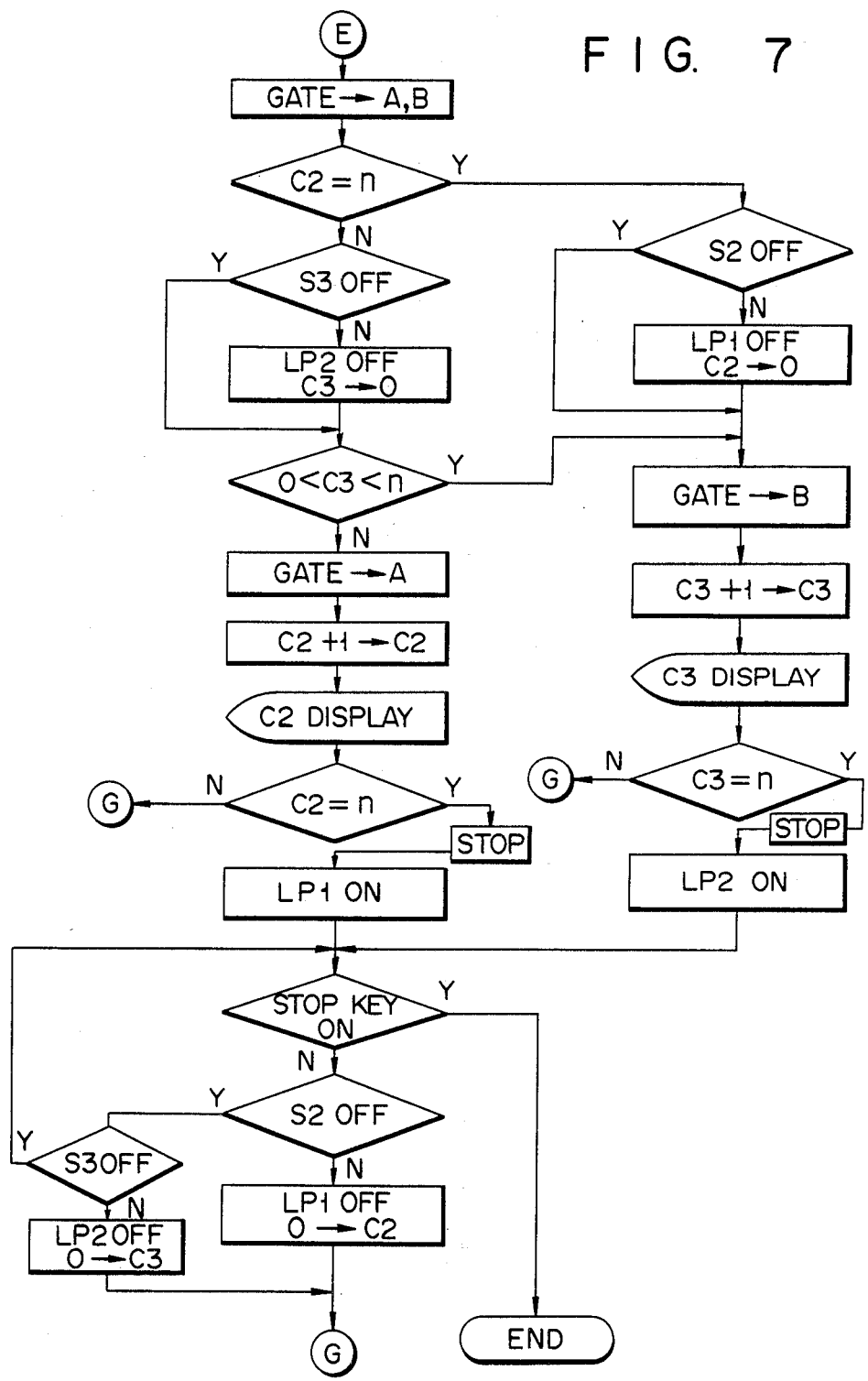

When the currency note inspecting section 11 discriminates that the transported note is a ten-thousand yen note, the CPU 30 executes the operation in accordance with the flowchart in FIG. 7. The CPU 30 drives the first gate section 12 to drive the first gate 12A, thereby forming a transport path toward the first and second pockets 5, 6. At this time, the CPU 30 determines whether or not the count of the second counter C2 has reached the preset number of notes which may be stacked in the first pocket 5. When the count has reached the preset number, the CPU 30 determines whether or not the notes are still present in the pocket 5, in accordance with the output from the second detector S2. After the operator takes the notes out of the first pocket 5 and no note is present therein, the CPU 30 turns off the first display lamp LP1 and clears the second counter C2. However, when the notes are present in the first pocket 5, the CPU 30 causes the second gate section 13 to drive the second gate 13A in such a way that the transport path is switched toward the second pocket 6.

When the count of the second counter C2 has not yet reached the preset number, the third detector S3 detects whether or not notes are present in the second pocket 6. When no note is present in the second pocket 6, the second display lamp LP2 is turned off and the third counter C3 is cleared. However, when notes are present in the second pocket 6, the second display lamp LP2 is kept ON, and the third counter C3 is not cleared. The CPU 30 determines whether or not the count of the third counter C3 falls within the range between 0 and the preset value (preset number of notes to be stacked). In other words, the CPU 30 determines whether the second pocket 6 is empty, full, or is in the process of stacking notes. When it is determined that notes are not being stacked in the second pocket 6, the second gate 13A forms the transport path toward the first pocket 5. However, when it is determined that notes are being stacked in the second pocket 6, the second gate 13A forms the transport path toward the second pocket 6. These operations are performed under the control of the CPU 30.

The notes fed to the first pocket 5 are counted by the second counter C2. When the count of the second counter C2 has not reached the preset value, the CPU 30 causes the routine to return to the node G of the flow. However, when the count of the second counter C2 has reached the preset value, the CPU 30 drives the lamp driver section 32 to turn off the display lamp LP1 so as to signal the full state of the first pocket 5. Similarly, the notes fed to the second pocket 6 are counted by the third counter C3. The notes are fed to the second pocket 6 until the count of the third counter C3 reaches the preset value. When the count of the third counter C3 has reached the preset value, the second display lamp LP2 is turned off in such a way as to signal the full state of the second pocket 6.

When the operator depresses the stop key 23 while the first and second display lamps LP1, LP2 are kept ON, the operation corresponding to a predetermined operation mode is stopped.

When the operator does not depress the stop key 23 while the first and second display lamps LP1, LP2 are kept ON and takes the notes out of the first pocket 5, the second detector S2 then detects the absence of notes in the first pocket 5. The CPU 30 is operated in response to this detection, to turn off the first display lamp LP1 and clear the second counter C2. The routine returns to the node G of the flow in FIG. 6. Therefore, the stacking of subsequent notes in the first pocket 5 is automatically restarted.

When the operator does not depress the stop key 23 and takes the notes out of the second pocket 6 while the pockets 5, 6 are full, subsequent notes are stacked in the second pocket 6, in the same manner as in the first pocket 5.

When the notes are taken out of the first pocket 5 while notes are being stacked in the second pocket 6, after the first pocket 5 is full, the first display lamp LP1 is turned off and the second counter C2 is cleared. The operation returns to node G of the flow in FIG. 6, so that the stacking operation continues. At this time, even if the count of the second counter C2 is set at zero, subsequent notes are stacked in the second pocket 6, since the count of the third counter C3 is equal to neither zero nor the preset value.

When the notes are taken out of the second pocket 6 while notes are being stacked in the first pocket 5, after the second pocket 6 is full, the second display lamp LP2 is turned off and the third counter C3 is cleared. The operation returns to the node G of the flow in FIG. 6. In this case, since the count of the second counter C2 is equal to neither zero nor the preset value, and the count of the third counter C3 is equal to zero, subsequent notes are stacked in the first pocket 5.

When the notes are taken out of either pockets 5 or 6, subsequent notes are automatically stacked in the empty pocket. Therefore, the notes can be taken out of the full pocket while subsequent notes are being automatically stacked in the empty pocket. Thereafter, when the empty pocket becomes full, subsequent notes are automatically re-stacked in the previously filled pocket from which the notes have already been taken out. Therefore, the notes are efficiently sorted and stacked in the first and second pockets 5, 6, alternately.

The count mode (a) can be executed in accordance with the one-denomination obverse/reverse nonsorting mode (c).

The operation with reference to a flow following a node B may be described as follows. When the normal/damaged note sorting mode (g) is designated at the operation section 1, the CPU 30 executes the flow shown in FIG. 8.

Figure 6:
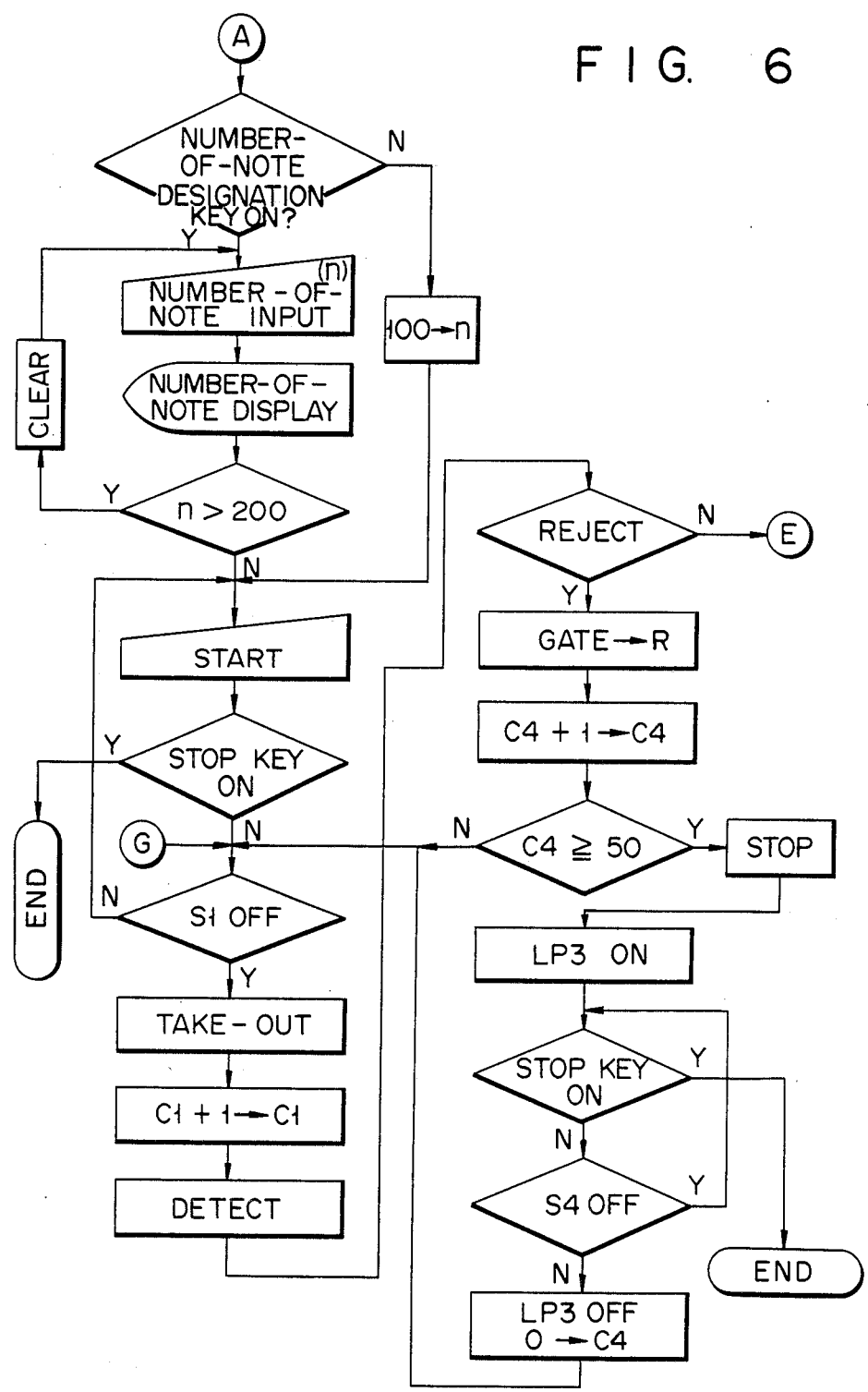
Figure 8:
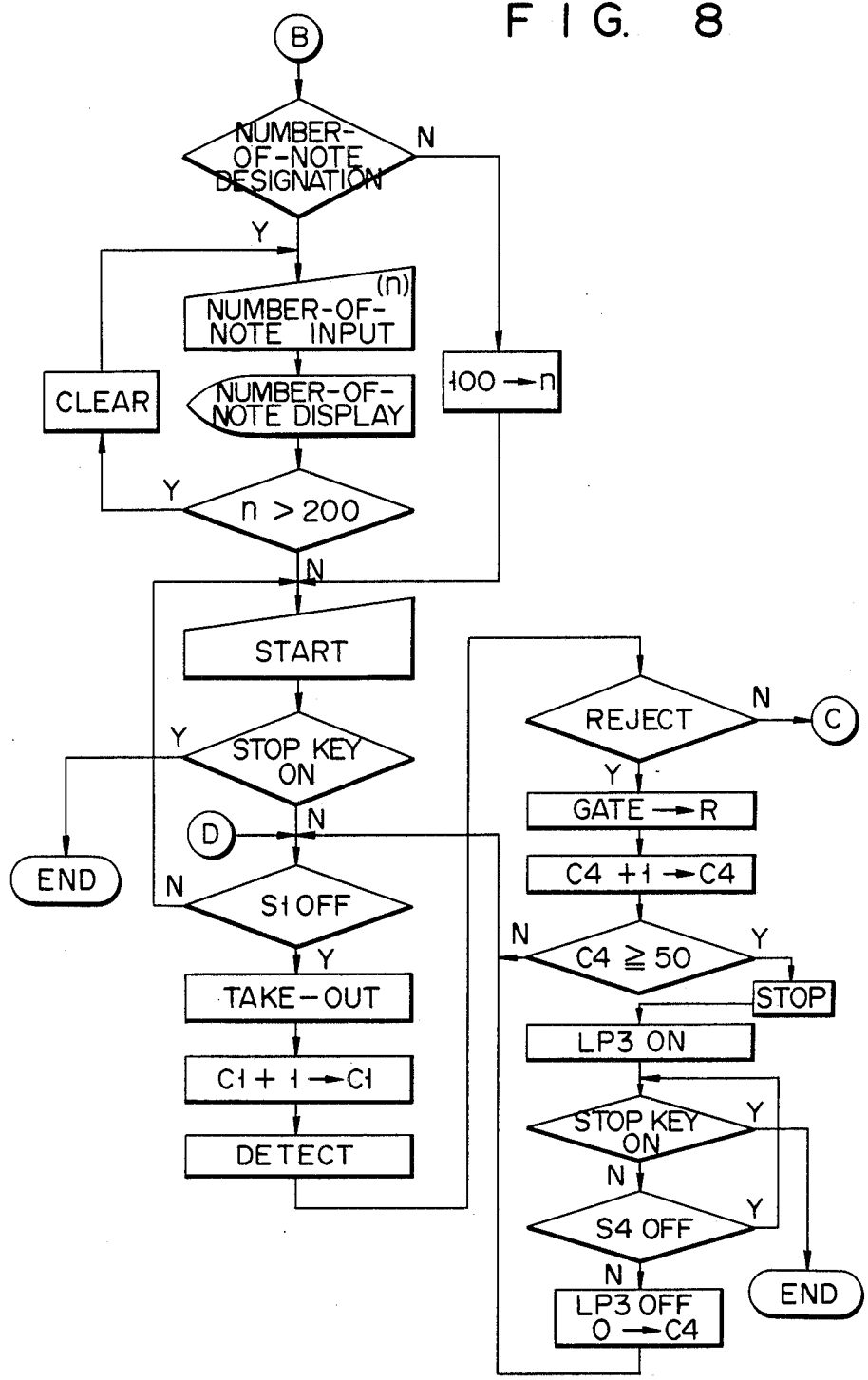

The steps from the number-of-notes designation step to the note reject step of the flow in FIG. 8 are the same as those in FIG. 6. In the flow shown in FIG. 8, the notes to be rejected include, reverse-presented notes among the notes of the specified denomination, notes of nonspecified denominations and unidentifiable notes.

Figure 9:
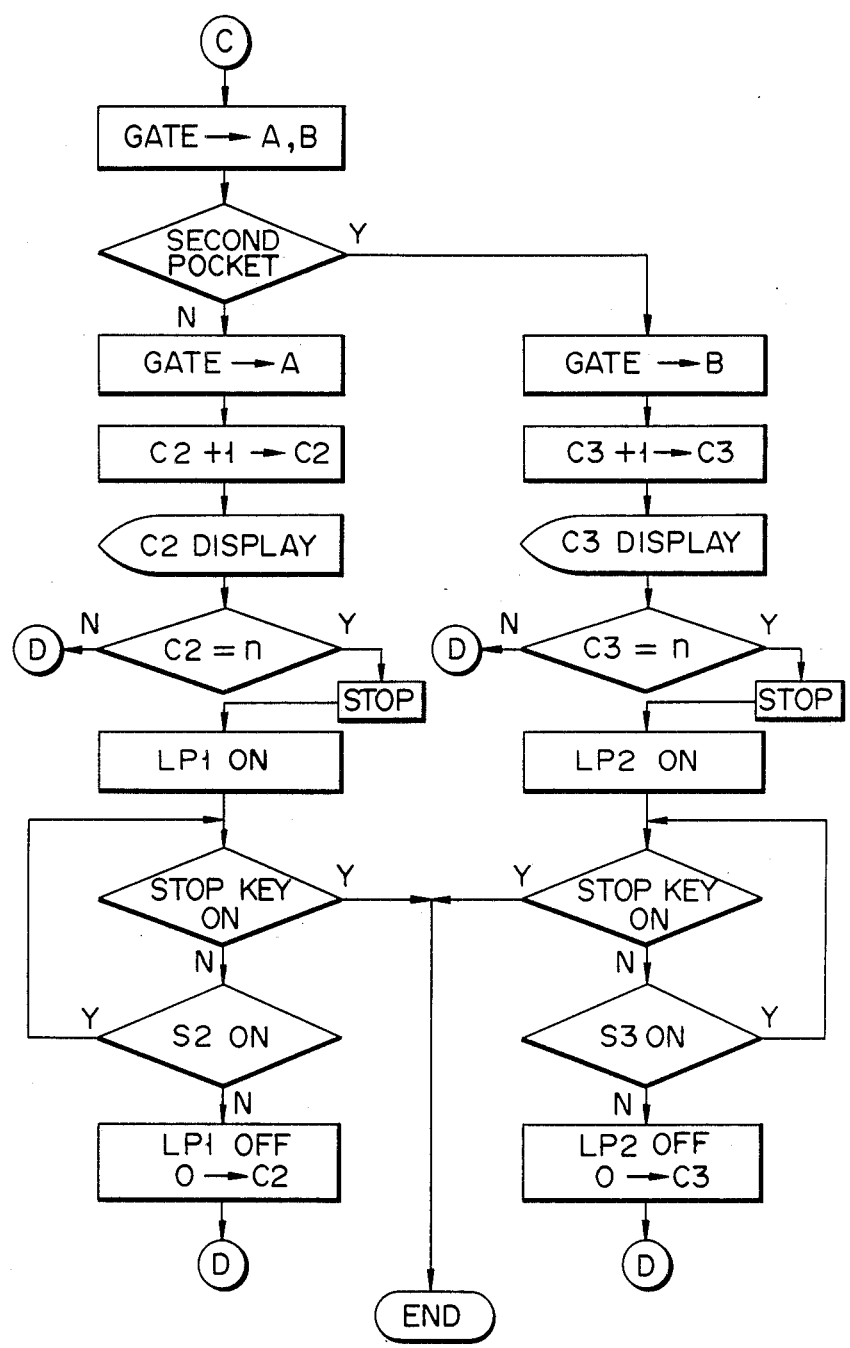

When the currency note inspecting section 11 discriminates that the transported notes (i.e., obverse-presented ten-thousand yen notes including both normal and damaged notes) should not be rejected, the flow shown in FIG. 9 is executed. The note is transported to the second gate section 13 along a transport path formed by the first gate 12A of the first gate section 12. The second gate section 13 switches the second gate 13A in accordance with the inspection result (i.e., damaged note or normal note) by the currency note inspecting section 11. When the transported note is a normal note, the CPU 30 drives the second gate section 13 in such a way that the second gate 13A forms a transport path toward the first pocket 5. However, when the transported note is a damaged note, the second gate 13A forms a transport path toward the second pocket 6. When the normal note is conveyed to the first pocket 5, this note is counted by the second counter C2. When the count of the second counter C2 has not reached the preset value, the operation is repeatedly performed in accordance with the flow in FIG. 8. When the count of the second counter C2 reaches the preset value, the second display lamp LP2 is turned on.

When the operator depresses the stop key 23 while the first display lamp LP1 or the second display lamp LP2 is turned on, the operation corresponding to a predetermined operation mode is stopped. However, when the operator does not depress the stop key 23 and takes out the normal notes from the first pocket 5, the second detector S2 detects the absence of notes in the first pocket 5. In response to the detected signal from the second detector S2, the CPU 30 is operated to turn off the first display lamp LP1 and clear the second counter C2. The routine returns to the node D of the flow in FIG. 8. When the operator does not depress the stop key 23 and takes the damaged notes out of the second pocket 6, the CPU 30 is operated to turn off the second display lamp LP2 and clear the third counter C3 in response to the detected signal from the third detector S3. The routine returns to the node D of the flow in FIG. 8.

As described above, obverse-presented normal notes, obverse-presented damaged notes, and other notes are sorted and stacked in their respective pockets. Any other sorting mode, such as the obverse/reverse sorting mode (b), the one-denomination obverse/reverse sorting mode (d), the two-denomination sorting mode (e) and the normal note (obverse/reverse) sorting mode (f) can be performed in the same manner as in the normal/damaged note sorting mode (g).

In the operation modes described above, the counts of the second and third counters C2, C3 are displayed in the corresponding display areas of the display section 2, as shown in FIGS. 7 and 9. When a preset number is specified by the number of notes key 20 and the ten keys 21, the preset number and the count can be compared at the display section 2. Even when the number of notes stacked in the currency note feeding section 4 is not enough to collect the preset number of notes, or the apparatus is stopped during the sorting and stacking operation, operator mishandling due to erroneous recognition of the preset number may not occur.

In the apparatus according to the embodiment of the present invention, the display lamps LP1, LP2, LP3 are so arranged as to indicate that the predetermined numbers of notes are respectively stacked in pockets 5, 6 and 7. The display lamps LP1, LP2, LP3 may be replaced with three buzzers having different tones. The positions of the display lamps LP1, LP2, LP3 are not limited to the sides of the pockets. The display lamps LP1, LP2, LP3 may be arranged in the display section 2. Furthermore, the apparatus may be illuminated at the display section 2, to indicate the pockets by means of lamps. Each member can be substituted by another member having an identical function. The apparatus of the present invention is described as a compact structure wherein notes to be sorted are stacked in the first and second pockets and notes to be rejected are stacked in the third pocket. However, the pockets need not be arranged in the manner described above. The apparatus according to the present invention can also be applied to the handling of other items, such as securities.

As may be seen from the above description, the sorting and stacking apparatus of the present invention can effectively sort and stack items to be sorted, and its operation can be easily effected.

What is claimed is:

1. A sorting and stacking apparatus comprising:
   means for feeding currency notes to be sorted, which currency notes are of various intermixed denominations;
   means for discriminating the currency notes of various denominations from each other in respect to at least one of denomination and surface condition of the currency notes, and producing identification and discrimination results indicative thereof;
   means for receiving notes including:
   (a) at least two identifiable note pockets for receiving identifiable currency notes which have been identified by said discriminating means, and
   (b) at least one rejected note pocket for receiving rejected currency notes which are not identifiable by said discriminating means;
   mode selecting means for selecting one of at least three modes and at least one denomination, including:
   (a) a first mode which is a count mode for: (1) stacking the identifiable notes in each of said at least two identifiable note pockets without sorting among the identifiable notes, and (2) stacking the unidentifiable notes in said at least one rejected note pocket, and (3) counting the notes received in each of said pockets,
   (b) a second mode which is a first designating mode for designating one discrimination result, and
   (c) a third mode which is a second designating mode for designating at least two discrimination results; and
   distributing means for:
   (1) distributing, in the first designating mode, the discriminated currency notes having said one discrimination result into said at least one identifiable note pockets so that when one pocket is filled with said discriminated currency notes, the remaining discriminated currency notes are received into another pocket,
   (2) distributing, in the second designating mode, the discriminated currency notes having said at least two discrimination results into said at least one identifiable note pockets, respectively so that each of said at least two discrimination results is in a separate pocket, and
   (3) distributing, in the count mode, the various denominations of identifiable currency notes which are intermixed into said at least one identifiable note pockets.

2. An apparatus according to claim 1, wherein said distributing means include means for detecting the full and empty states of said pockets, and gating means for switching the transport path of the currency notes from the full pocket to the empty pocket in the first designating mode selected by said selecting means.

3. An apparatus according to claim 2, wherein said detecting means includes counting means for counting the number of currency notes received into said pockets and means for detecting a predetermined count of said counting means as the full state.

4. An apparatus according to claim 1, wherein said discriminating means includes means for determining the surface conditions of an obverse-presented note and a reverse-presented note.

5. An apparatus as in claim 1 wherein said discrimination result is denomination of the notes.

* * * * *